United States Patent
Bouvet

(10) Patent No.: US 10,778,732 B2
(45) Date of Patent: Sep. 15, 2020

(54) METHOD OF DETECTING A SPOOFING OF IDENTITY BELONGING TO A DOMAIN

(71) Applicant: Orange, Paris (FR)

(72) Inventor: Bertrand Bouvet, Perros Guirec (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/300,665

(22) PCT Filed: Mar. 27, 2015

(86) PCT No.: PCT/FR2015/050797
§ 371 (c)(1),
(2) Date: Sep. 29, 2016

(87) PCT Pub. No.: WO2015/150674
PCT Pub. Date: Oct. 8, 2015

(65) Prior Publication Data
US 2017/0118256 A1    Apr. 27, 2017

(30) Foreign Application Priority Data

Mar. 31, 2014    (FR) .................................... 14 52787

(51) Int. Cl.
*H04L 29/06*    (2006.01)
*H04L 12/46*    (2006.01)
*H04W 12/06*    (2009.01)

(52) U.S. Cl.
CPC ...... *H04L 65/1076* (2013.01); *H04L 12/4625* (2013.01); *H04L 63/126* (2013.01);
(Continued)

(58) Field of Classification Search
CPC ............. H04L 65/1076; H04L 65/1016; H04L 65/1046; H04L 63/126; H04L 65/1006; H04L 65/1009; H04L 63/1483
See application file for complete search history.

(56) References Cited

U.S. PATENT DOCUMENTS

| 5,953,399 A | 9/1999 | Farris et al. |
| 2003/0021403 A1* | 1/2003 | Jones ..................... H04M 1/576 |
| | | 379/210.02 |

(Continued)

OTHER PUBLICATIONS

International Search Report dated Jun. 18, 2015 for corresponding International Application No. PCT/FR2015/050797, filed Mar. 27, 2015.

(Continued)

*Primary Examiner* — Oussama Roudani
(74) *Attorney, Agent, or Firm* — David D. Brush; Westman, Champlin & Koehler, P.A.

(57) ABSTRACT

A method of control, by a piece of management equipment of a first telecommunication domain, of the authenticity of at least one relationship datum relating to the initiator of a communication and indicated in a message for establishing the communication originating from a second telecommunication domain and destined for the first telecommunication domain. The method includes, upon receipt of the message by the management equipment, extracting the at least one relationship datum from the message; searching for the at least one relationship datum in at least one database of the relationship data associated with the first domain, and rejecting the communication when an occurrence of the at least one relationship datum is found in the database.

5 Claims, 3 Drawing Sheets

(52) U.S. Cl.
CPC ...... *H04L 65/1006* (2013.01); *H04L 65/1016* (2013.01); *H04L 65/1046* (2013.01); *H04W 12/06* (2013.01); *H04L 63/1483* (2013.01); *H04L 65/1009* (2013.01)

(56) References Cited

U.S. PATENT DOCUMENTS

| | | | |
|---|---|---|---|
| 2007/0036314 A1* | 2/2007 | Kloberdans | H04L 63/14 379/189 |
| 2007/0127658 A1 | 6/2007 | Gruchala et al. | |
| 2007/0165821 A1* | 7/2007 | Altberg | H04L 29/06027 379/210.02 |
| 2008/0159501 A1 | 7/2008 | Cai | |
| 2008/0220740 A1* | 9/2008 | Shatzkamer | H04L 63/101 455/411 |
| 2009/0103458 A1* | 4/2009 | Charzinski | H04L 29/06027 370/259 |
| 2010/0226261 A1* | 9/2010 | Piche | H04L 29/06027 370/252 |
| 2011/0138462 A1* | 6/2011 | Kim | H04L 63/0236 726/22 |
| 2011/0142035 A1* | 6/2011 | Ku | H04L 63/0853 370/352 |
| 2011/0179181 A1* | 7/2011 | Elz | H04L 65/1069 709/227 |
| 2011/0222481 A1 | 9/2011 | Shiga et al. | |
| 2012/0297457 A1* | 11/2012 | Schulte | G06F 21/56 726/4 |

OTHER PUBLICATIONS

Written Opinion of the International Searching Authority dated Jun. 18, 2015 for corresponding International Application No. PCT/FR2015/050797, filed Mar. 27, 2015.

International Preliminary Report on Patentability and English translation of the Written Opinion of the International Searching Authority dated Oct. 14, 2016 for corresponding International Application No. PCT/FR2015/050797, filed Mar. 27, 2015.

* cited by examiner

METHOD OF DETECTING A SPOOFING OF IDENTITY BELONGING TO A DOMAIN

CROSS-REFERENCE TO RELATED APPLICATIONS

This Application is a Section 371 National Stage Application of International Application No. PCT/FR2015/050797, filed Mar. 27, 2015, the content of which is incorporated herein by reference in its entirety, and published as WO 2015/150674 on Oct. 8, 2015, not in English.

FIELD OF THE DISCLOSURE

The present invention lies in the domain of telecommunications and particularly concerns a method of detecting identity spoofing in the establishment of a communication.

BACKGROUND OF THE DISCLOSURE

Most suppliers of telephone services offer their subscribers a service of displaying the call number. Thus, when a call is displayed on the terminal of a subscriber, the latter may know the caller's number. This information is often used by the terminal to deduce the name of the caller from a search in an address book.

With the expansion of the Internet, there is today a steep increase in the number of cases of identity spoofing. Cases of spoofing telephone numbers or email addresses are particularly frequent and greatly facilitated by current technologies. For example, in order to circumvent the filtering of hidden numbers and to encourage correspondents to respond, some unscrupulous call centers insert a number of a third party in the caller number field. These call centers sometimes insert the number of a subscriber geographically close to the person to be reached in the caller number field, so that the number displayed seems familiar to them, thus encouraging them to respond. The number thus inserted may be changed regularly so as not to arouse suspicion among the operators.

In other cases, the spoofer sends their victim a message by pretending to be a trusted organization, e.g. a well-known public or private organization so as to encourage the victim to reveal personal information, such as login IDs or a credit card number.

There are also paid online services that enable a communication to be established to a correspondent while displaying a telephone number freely chosen by the caller.

Communication over IP services do not have physical criteria for certifying the caller number displayed by a subscriber as is the case with a PSTN (Public Switched Telephone Network) or ISDN (Integrated Services Digital Network) line. This phenomenon will continue to spread since it is very simple for unscrupulous persons to configure any caller number in a VoIP communication. In fact, more and more communication solutions enable users to configure their telephone number themselves without any check being made. For example, there are WebRTC communication solutions interconnected with the PSTN or IMS (IP Multimedia Subsystem) network, which can be used to enter caller numbers without any real possibility of checking.

There are solutions for verifying the validity of a caller number inserted by a PBX (Private Branch Exchange) connected to a PSTN network, e.g. the solution described in patent application U.S. Pat. No. 5,953,399 A. Here it is a matter of verifying that the number inserted in the call signaling by the PBX correctly corresponds to a number associated with the PSTN line. Patent application US 20070127658 A1 also provides a solution based on a comparison of the caller number inserted in the signaling and the number associated with the corresponding PSTN line. Although these solutions are effective in a context of interconnection with a PSTN network, they are of no use for curbing fraud in an all IP (Internet Protocol) system.

Since spoofing a telephone number may be fraught with consequences for the subscriber whose number is spoofed, there is a real need for a solution aimed at protecting subscribers from these practices, particularly in the context of communications over IP.

The present invention improves the situation.

SUMMARY

For this purpose, according to a first aspect, the invention concerns a method of checking, by a piece of management equipment in a first telecommunication domain, of the authenticity of at least one piece of connection data relating to the initiator of a communication and indicated in a message for establishing the communication originating from a second telecommunication domain and destined for the first telecommunication domain. The method is such that it comprises, on reception of the message by the management equipment, steps of extracting the at least one piece of connection data from the message; of searching for the at least one piece of connection data in at least one database of connection data associated with the first domain, and of rejecting the communication when an occurrence of the at least one piece of connection data is found in the database.

A telecommunication domain as understood in this document is a logical entity for which an operator is responsible, with which users or subscribers of the domain are associated. For example, a telecommunication domain may be an IMS network of an operator offering communication services to its subscribers. The concept of telecommunication domain within the meaning of the present invention may also correspond to an Internet domain, for example. Various communication domains may be interconnected using interconnection equipment and links so as to enable the establishment of communications from one domain to another.

A communication initiated by a subscriber of the first domain to another subscriber of this same domain does not pass through the interconnection link. That is why, when the message arrives in the first telecommunication domain via an interconnection with a third-party network, the management equipment verifies that the piece of connection data relating to the caller indicated in the message does not designate a subscriber of the first domain since if such is the case, the piece of connection data relating to the caller is invalid. The operator of the first telecommunication domain may thus be assured that none of its subscribers' numbers is spoofed in a call originating from a third-party telecommunication network.

According to a particular embodiment, the method is such that it further comprises steps of searching for the at least one piece of connection data in at least one second database of connection data associated with the second domain, and of rejecting the communication when an occurrence of the at least one piece of connection data is not found in the second database.

When the piece of connection data relating to the caller indicated in the message does not correspond to a subscriber of the domain from which it originates, the piece of connection data is invalid. The method according to the invention thus makes it possible to detect a possible spoofing of a piece of connection data relating to the caller.

According to a particular embodiment, the method is such that the piece of connection data relating to the caller comprises at least one piece of data of a type included in the set consisting of the following types: a telephone number, an email address, a contact address on the Internet, or a communication identifier.

The method is thus capable of detecting the spoofing of a telephone number, e.g. during the initiation of a telephone communication, the sending of an SMS (Short Message Service) or an MMS (Multimedia Message Service). The method is also capable of detecting the use of an invalid email address during the sending of an email or of detecting a spoofing of identity during a communication on the Internet, e.g. during the use of messaging associated with a social network. The communication identifier may be the MAC (Media Access Control) address of a communicating object, an IMEI (International Mobile Equipment Identity) number or a bar code, for example.

The invention also concerns a device for checking the authenticity of at least one piece of connection data relating to the initiator of a communication and indicated in a message for establishing the communication to a first telecommunication domain and originating from a second telecommunication domain. The device is such that it comprises means of receiving the message for establishing the communication, of extracting the at least one piece of connection data from the message; of searching for the at least one piece of connection data in at least one database of connection data associated with the first domain, and of rejecting the communication when an occurrence of the at least one piece of connection data is found in the database.

The invention also concerns a server including a device for checking the authenticity of at least one piece of connection data relating to the caller as described above.

The invention also concerns a computer program comprising the instructions for the execution of the method of checking the authenticity of at least one piece of connection data relating to a caller as described above, when the program is executed by a processor.

Finally, the invention concerns an information medium readable by a computer on which a computer program is recorded including instructions for the execution of the steps in the method for checking the authenticity of at least one piece of connection data as described above.

The information medium may be any entity or device capable of storing the program. For example, the medium may comprise a means of storage, such as a ROM, e.g. a CD-ROM or a microelectronic circuit ROM, or a means of magnetic recording, e.g. a diskette (floppy disk) or a hard disk. Moreover, the information medium may be a transmissible medium such as an electrical or optical signal, which may be routed via an electrical or optical cable, by radio or by other means. The program according to the invention may in particular be downloaded on an Internet type network. Alternatively, the information medium may be an integrated circuit incorporating the program, the circuit being suitable for executing or for being used in the execution of the method in question.

The servers, devices and programs offer advantages similar to those of the corresponding method described above.

BRIEF DESCRIPTION OF THE DRAWINGS

Other features and advantages of the invention will appear more clearly on reading the following description of a particular embodiment of the invention, given as a simple, illustrative and non-restrictive example, and the accompanying drawings, in which.

DETAILED DESCRIPTION OF ILLUSTRATIVE EMBODIMENTS

The following description as well as the associated figures are given as a non-restrictive example of a particular embodiment of the invention.

Figure 1:
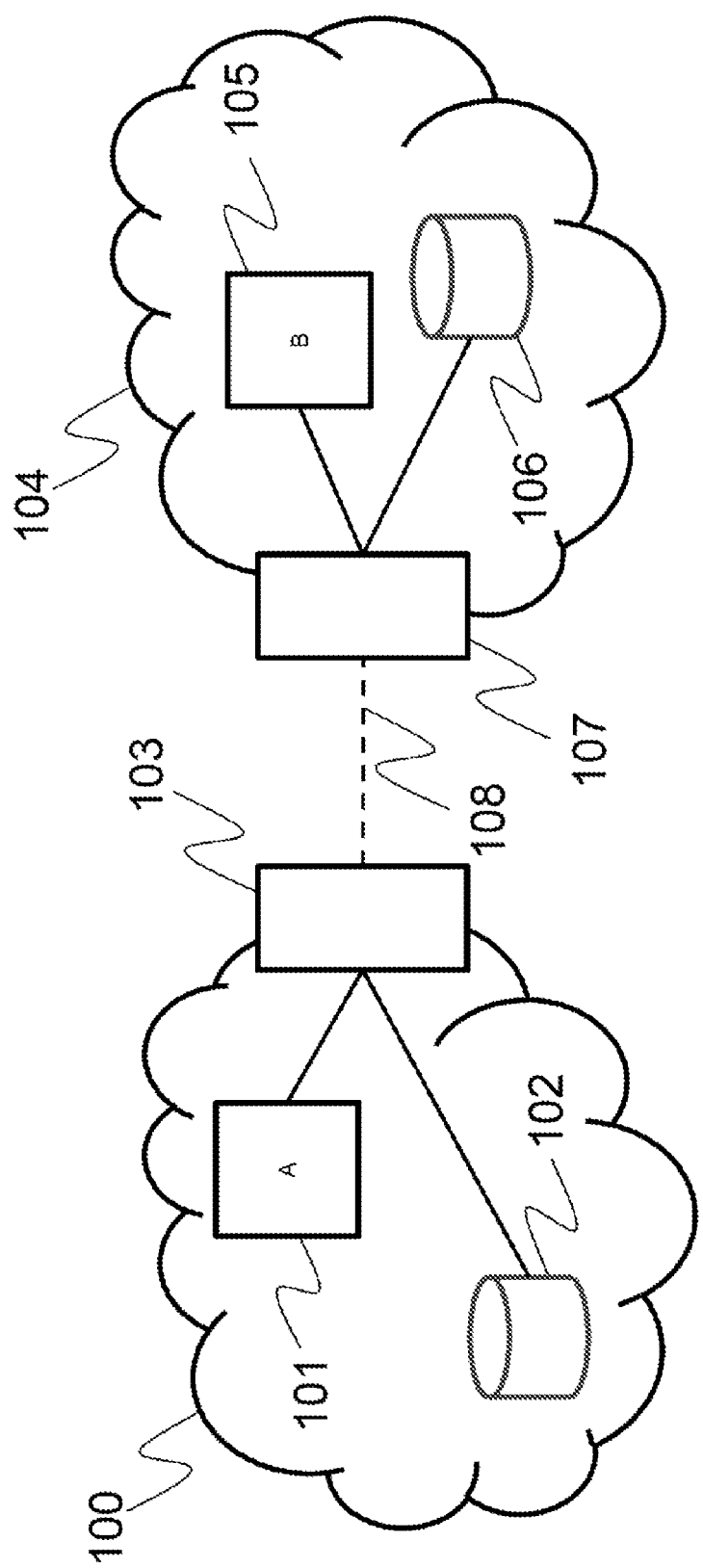
FIG. 1 simply illustrates a network architecture suitable for the implementation of the invention according to a particular embodiment.

FIG. 1 illustrates an example of network architecture suitable for the implementation of the method for checking the authenticity of a piece of connection data according to an embodiment of the present invention; however, it will not escape the person skilled in the art that additional components may be present or that some components may be grouped together in the same entity or conversely distributed over multiple entities. The invention is described here in the context of an IMS (IP Multimedia Subsystem) telecommunication network but may apply to any type of communication networks and services, e.g. a PSTN network. According to another embodiment of the invention, the method may apply to messaging services, e.g. email, SMS (Short Message Service) or MMS (Multimedia Message Service) messaging.

FIG. 1 represents a first telecommunication network 100, e.g. an IMS network, defining a first telecommunication domain. This IMS network comprises a piece of management equipment 103 implementing the method for checking authenticity, a database 102 in which the call identifiers of the subscribers to the telecommunication network 100 are entered and a terminal 101 associated with a subscriber A, which may be, for example, a mobile phone registered on the IMS network 100. The management equipment is suitable for intercepting the call signaling originating from a third-party network or domain, e.g. the network 104, connected to the network 100 via an interconnection 108. According to a particular embodiment, the management equipment may be a switch in a PSTN (Public Switched Telephone Network) or an MTA (Mail Transport Agent) network in the case of email messaging. In the case of an IMS network, the management equipment 103 may be an I-CSCF (Interrogating-Call Session Control Function), an I-SBC (Interconnection-Session Border Controller) or, for example, a SIP Call Server whereof the role is to ensure protocol interoperability with equipment implementing other communication technologies (H.323, ISUP, etc.) and to query, for example, a portability server. The database 102 is, for example, an HSS (Home Subscriber Server) or a portability server or any other database for testing that a piece of connection data belongs to a telecommunication domain. The users referenced in the database 102 thus belong to the same telecommunication domain that the operator of the network 100 is responsible for managing. The operator of the network 100 may thus assign to its subscribers a piece of connection data, e.g. a telephone call identifier, an email address, a contact address on the Internet (URL, URI, identifier on a social network, etc.) or any communication identifier, e.g. a MAC address or a bar code. This piece of connection data belongs to a set of connection data which has been assigned to the operator for its subscribers. For example, this set may correspond to one or more ranges of telephone numbers or one or more Internet domains.

FIG. 1 also represents a second telecommunication network 104 defining a second telecommunication domain, e.g. an IMS network. This IMS network comprises a piece of management equipment 107 implementing the method for checking authenticity, a database 106 in which the call identifiers of the subscribers to the telecommunication network 104 are entered and a terminal 105 associated with a subscriber B, which may be, for example, a mobile phone registered on the IMS network 104. The management equipment is suitable for intercepting the call signaling originating from a third-party network or domain, e.g. the network 100, connected to the network 104 via an interconnection 108. According to a particular embodiment, the management equipment may be a switch in a PSTN or an MTA (Mail Transport Agent) network in the case of email messaging. In the case of an IMS network, the management equipment 107 may be an I-CSCF (Interrogating-Call Session Control Function), an I-SBC (Interconnection-Session Border Controller) or, for example, a SIP Call Server whereof the role is to ensure protocol interoperability (H.323, ISUP, etc.) and to query, for example, a portability server. In general, the method may be implemented on any other equipment suitable for intercepting the call signaling originating from a third-party network and for consulting a database of subscribers in the domain. The database 106 is, for example, an HSS (Home Subscriber Server) or a portability server or any other database for verifying that a piece of connection data belongs to a telecommunication domain. The users referenced in the database 106 thus belong to the same telecommunication domain that the operator of the network 104 is responsible for managing. The operator of the network 104 may thus assign to its subscribers a piece of connection data, e.g. a telephone call identifier, an email address, or a contact address on the Internet (URL, URI, identifier on a social network, etc.). This piece of connection data belongs to a set of connection data which has been assigned to the operator for its subscribers. For example, this set may correspond to one or more ranges of telephone numbers or one or more Internet domains.

The networks 100 and 104 are interconnected via a link 108.

This architecture is thus suitable for establishing a communication initiated by the terminal 101 to the terminal 105, e.g. an audio, video communication or a message exchange. The terminal 101 may be, for example, a VoIP terminal suitable for placing a call to the terminal 105 via the networks 100 and 104 using the link 108. When the terminal 101 initiates a communication, e.g. a telephone call to the terminal 105, the call signaling data pass through the pieces of management equipment 103 and 107. When the equipment 107 receives a call initiation message, e.g. a SIP (Session Initiation Protocol) INVITE message, the management equipment 107 conventionally queries the database 106 in order to ensure that the recipient of the communication belongs to the telecommunication domain of the network of 104 and to locate the terminal. If the recipient of the call actually belongs to the network 104, and the call emanates from another telecommunication domain, e.g. the network 100, the equipment 107 will implement the method according to the invention in order to determine the validity of the caller number indicated in the signaling message. For example, in the case of a SIP communication, the equipment 107 will verify the validity of the "from" field and/or the "P-Asserted-ID" field present in the INVITE message initiating the communication. For this, the management equipment 107 consults, according to a particular embodiment, the database 106 in order to determine whether the caller number belongs to the network 104. Thus, if the caller number indicated in a message originating from the telecommunication domain 100 is present in the database 106 of the users of the network 104, then the caller number is invalid. According to another embodiment, the equipment 107 may query the database 102 of the network 100 in order to confirm that the submitted call identifier belongs to the domain of origin of the call.

Figure 2:
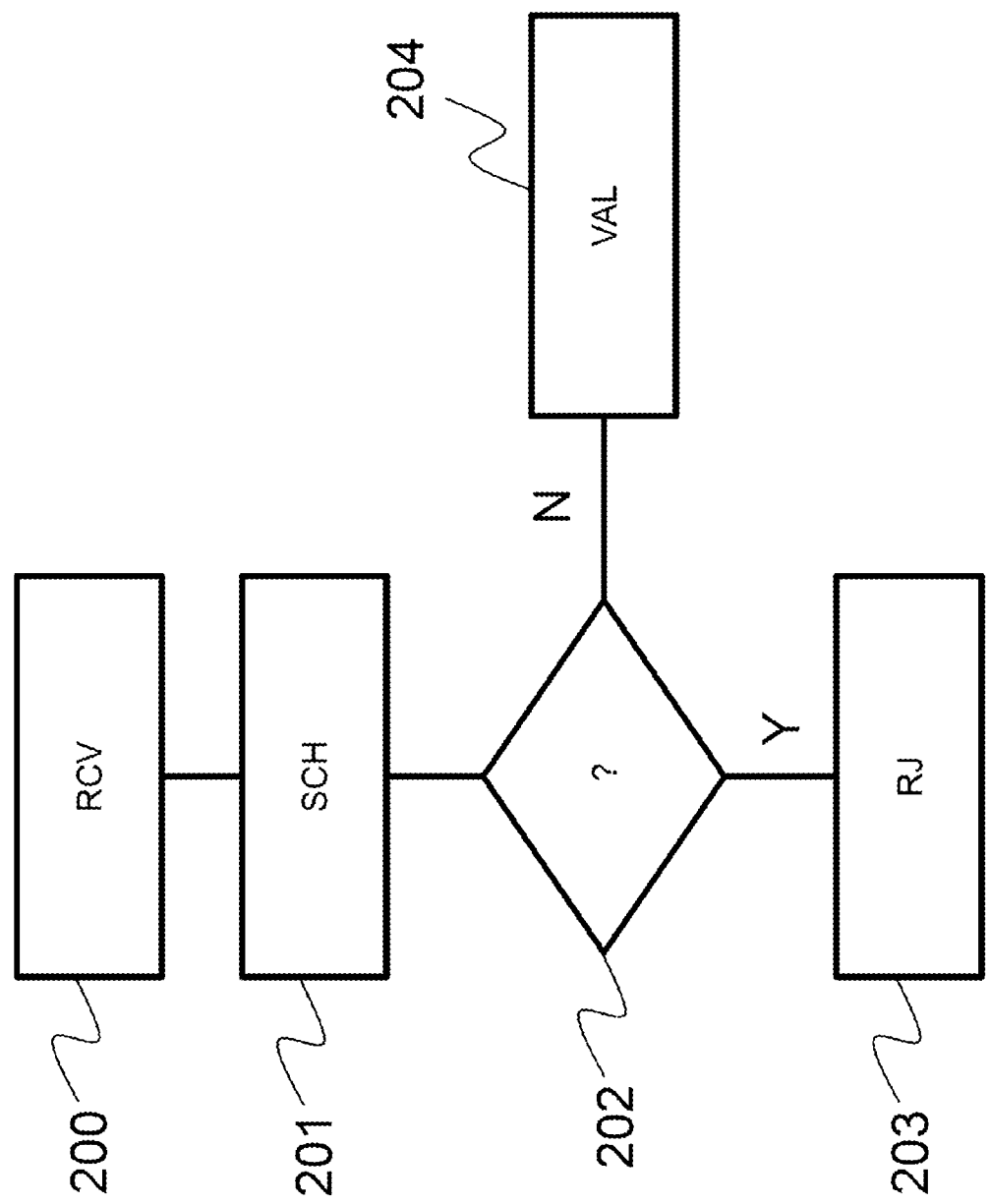
FIG. 2 illustrates the main steps in the method for checking the authenticity of a piece of connection data according to an embodiment of the present invention.

FIG. 2 diagrammatically illustrates the main steps in the method according to a particular embodiment of the invention. In order to illustrate the method, the following description takes the example of a call initiated by the terminal 101 in FIG. 1 to the terminal 105, which belongs to the network 104. The equipment 107 implements the method of checking according to the invention and is suitable for intercepting the communication signaling originating from a third-party network and querying a database of subscribers in the domain, e.g. the database 106 in FIG. 1.

In a first step 200, a message for establishing a communication originating from a first telecommunication domain, e.g. the network 100 in FIG. 1, is received by a piece of management equipment in a second telecommunication domain, e.g. the network 104 in FIG. 1. The received message may be, for example, a SIP, H.323, SS7, GSM signaling message or an SMS, MMS or email message. The message is then analyzed so as to extract a piece of connection data therefrom associated with the sender of the message. It may be, for example, the contents of the "from" or "P-Asserted-ID" field of a SIP message for a telephone, videophone call, SMS etc., or of the "from" field of an email. The piece of connection data obtained from the message may be, for example, a URL, a telephone number, an email address or, for example, a SIP URI (Uniform Resource Identifier).

In a step 201, the management equipment 107 performs a search in a database of the subscribers in the telecommunication domain of the recipient from the piece of connection data extracted from the message. In the case of an IMS network, the management equipment may, for example, send an "LIR" (Location Information Request) message according to the "Diameter" protocol (RFC 3588) for querying the HSS server (Home Subscriber Server) of the domain on the basis of the caller number contained in the "from" and/or "P-Asserted-ID" field of the received SIP INVITE message. In response to this message, the HSS server sends a "Diameter LIA" (Location Information Answer) response containing an error code when the caller number has not been found in the database.

In step 202, the management equipment interprets the response from the HSS. When the "Diameter LIA" message contains an error code indicating that the caller number sought has not been found, then the caller number indicated in the communication initiation message is not the result of the spoofing of a number assigned to a subscriber in the telecommunication domain. If on the other hand the "Diameter LIA" response indicates that a subscriber has been found in the database associated with the HSS server, then the caller number indicated in the communication initiation message has been spoofed. Indeed, the communication initiation message cannot both come from a third-party domain via an interconnection and designate a caller forming part of the search domain. Such a contradiction demonstrates the invalidity of the submitted caller number.

In step 203, when the caller number is invalid, the management equipment rejects the call by sending, for example, an error code to the sender. For example, in the case of using the SIP protocol, the response may be "404 Not Found". According to a particular embodiment, a voice announcement may be played to the caller indicating to him/her that the call cannot be successfully completed since the caller number is invalid. The announcement may be played using the SIP functionality called "early media" for playing media without connecting the call, so as to play the announcement to the caller without connecting the call thus avoiding it being billed. The operator of a network may thus ensure that no call originating from a third-party network spoofs the number of one of its subscribers.

In step 204, if the caller number is valid, the management equipment conventionally routes the call to the recipient.

According to a particular embodiment of the invention, the management equipment 107 in FIG. 1 is suitable for consulting a database 102 of subscribers of the network 100. The database 102 may be queried directly or via a piece of equipment capable of relaying the consultation request to the database, e.g. an SBC (Session Border Controller). The method then comprises a step of querying a database containing the connection data relating to the subscribers of the network from which the communication initiation message is sent. Then comes a step of interpreting the response to the query message: when the response to the message querying the database of the network from which the communication is initiated indicates that the caller number is not the number of a subscriber to this network, the caller number is obviously invalid and the management equipment of the recipient network implementing the invention may reject the request for establishing the communication.

Figure 3:
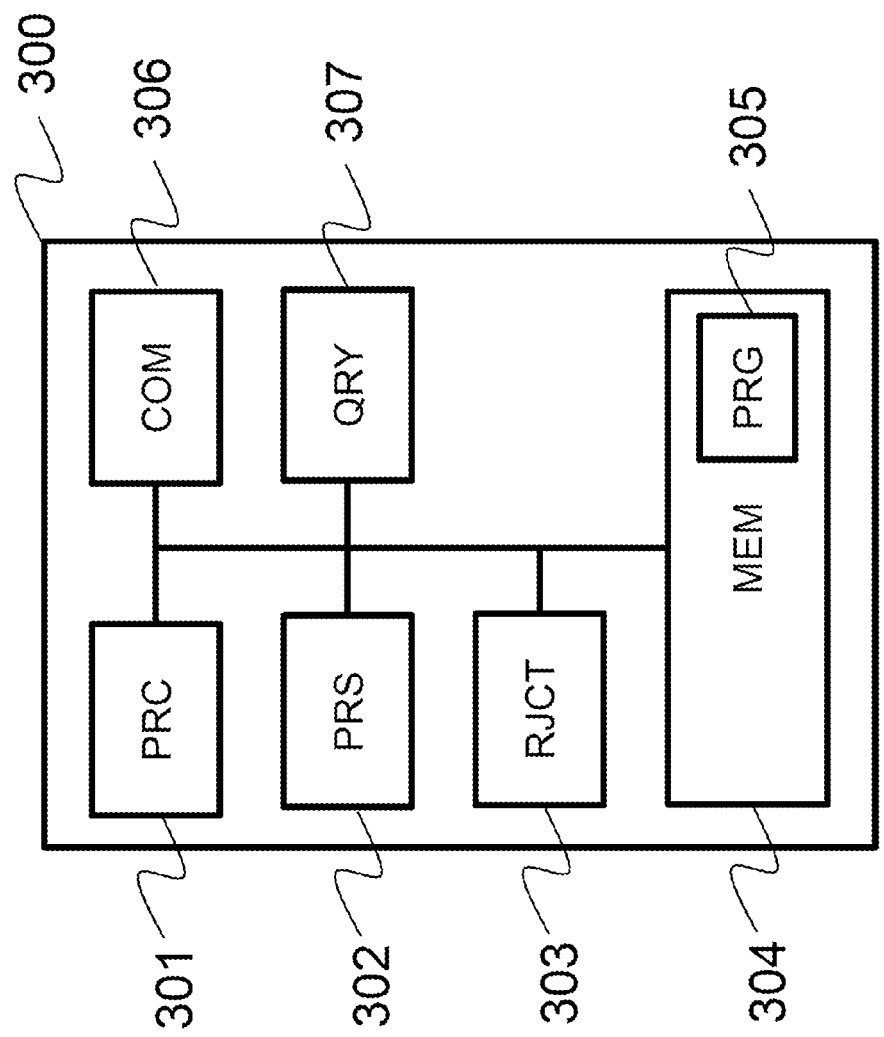
FIG. 3 illustrates a device implementing the method for checking the authenticity of a piece of connection data according to a particular embodiment of the invention.

FIG. 3 illustrates the architecture of a device 300 implementing the method for checking the authenticity of a piece of connection data according to an embodiment of the invention. The device includes a storage space 304, e.g. a memory MEM and a processing unit 301 provided, for example, with a processor PROC. The processing unit may be controlled by a program 305, e.g. a computer program PGR, implementing the method of checking as described in the invention with reference to FIGS. 1 and 2, and notably the steps of extracting (200) a piece of connection data relating to the initiator of a communication from a message for establishing the communication, of searching (201) for at least one piece of connection data in at least one database of connection data associated with the destination domain, and of rejecting (203) the communication if an occurrence of the piece of connection data is found in the database.

On initialization, the instructions of the computer program 305 are, for example, loaded into a RAM (Random Access Memory) memory, before being executed by the processor of the processing unit 301. The processor of the processing unit 301 implements the steps of the method, according to the instructions of the computer program 305. For this, the device includes, in addition to the memory 304, means of extracting 302 (PARSE) at least one piece of connection data from a message for establishing communication, of searching 307 (QUERY) for at least one piece of connection data in at least one database of connection data associated with the destination domain of the communication, and of rejecting 303 (REJECT) the communication when an occurrence of the one piece of connection data is found in the database. The device further includes communication means 306 (COM), e.g. a network interface, suitable for sending and receiving messages, and in particular for receiving a message for establishing a communication and sending messages for querying a database.

According to one embodiment, the device may be integrated into a piece of server equipment.

Although the present disclosure has been described with reference to one or more examples, workers skilled in the art will recognize that changes may be made in form and detail without departing from the scope of the disclosure and/or the appended claims.

The invention claimed is:

1. A method comprising:
   checking, by a piece of management equipment in a first telecommunication domain, of authenticity of at least one call identifier of a caller and indicated in a message for establishing a communication originating from a second telecommunication domain and destined for the first telecommunication domain,
   wherein the checking comprises, on reception of the message by the management equipment, the following acts:
   extracting the at least one call identifier of the caller from the message;
   searching for the at least one call identifier of the caller in at least one first database referencing subscribers of the same first telecommunication domain and in at least one second database referencing subscribers of the same second telecommunication domain, and
   determining whether the at least one call identifier is a call identifier of a subscriber that belongs to the first telecommunication domain and whether the at least one call identifier is a call identifier of a subscriber that belongs to the second telecommunication domain; and
   rejecting the communication in response to:
   an occurrence of the at least one call identifier is found in the first database and is a call identifier of a subscriber that belongs to the first telecommunication domain; and
   no occurrence of the at least one call identifier of the caller is found in the second database.

2. The method as claimed in claim 1, wherein the at least one call identifier comprises at least one piece of data of one of the following types:
   a telephone number,
   an email address,
   a contact address on the Internet, or
   a communication identifier.

3. A device for checking authenticity of at least one call identifier of a caller and indicated in a message for establishing a communication destined for a first telecommunication domain and originating from a second telecommunication domain, wherein the device comprises:
   a non-transitory computer-readable memory comprising program code instructions stored thereon;
   a processor configured by the instructions to perform acts comprising:
   receiving the message for establishing a communication;
   extracting the at least one call identifier of the caller from the message;
   searching for the at least one call identifier of the caller in at least one first database referencing subscribers of the same first telecommunication domain and in at least one second database referencing subscribers of the same second telecommunication domain, and
   determining whether the at least one call identifier is a call identifier of a subscriber that belongs to the first telecommunication domain and whether the at least one call identifier is a call identifier of a subscriber that belongs to the second telecommunication domain; and rejecting the communication in response to:

an occurrence of the at least one call identifier is found in the first database and is a call identifier of a subscriber that belongs to the first telecommunication domain; and no occurrence of the at least one call identifier of the caller is found in the second database.

4. The device as claimed in claim 3, wherein the device is a server.

5. A non-transitory recording medium readable by a computer on which a computer program is recorded including instructions for execution of a method when the instructions are executed by a processor of a piece of management equipment, wherein the instructions configure the processor to perform acts comprising:

checking, by the piece of management equipment in a first telecommunication domain, of authenticity of at least one call identifier of a caller and indicated in a message for establishing a communication originating from a second telecommunication domain and destined for the first telecommunication domain, wherein the checking comprises, on reception of the message by the management equipment, the following acts:

extracting the at least one call identifier of the caller from the message;

searching for the at least one call identifier of the caller in at least one first database referencing subscribers of the same first telecommunication domain and in at least one second database referencing subscribers of the same second telecommunication domain, and determining whether the at least one call identifier is a call identifier of a subscriber that belongs to the first telecommunication domain and whether the at least one call identifier is a call identifier of a subscriber that belongs to the second telecommunication domain; and rejecting the communication in response to:

an occurrence of the at least one call identifier is found in the first database and is a call identifier of a subscriber that belongs to the first telecommunication domain; and no occurrence of the at least one call identifier of the caller is found in the second database.

\* \* \* \* \*